United States Patent Office 3,194,737
Patented July 13, 1965

3,194,737
PROCESS FOR REMOVING AND PURIFYING WATER SOLUBLE CONSTITUENTS FROM A KERATIN STRUCTURE
Otto Karl Jacobi, Wiesbaden-Igstadt, Germany, assignor to Kolmar Laboratories, Inc., Milwaukee, Wis., a corporation of Delaware
No Drawing. Filed Apr. 5, 1961, Ser. No. 100,811
4 Claims. (Cl. 167—90)

This invention relates to a process for removing and purifying the water soluble materials from a keratin structure.

The epidermis or outer layer of skin is composed of two layers, the stratum granulosum and the stratum corneum which is located outwardly of the stratum granulosum and is separated therefrom by a transparent layer of cells called the stratum lucidum. The innermost layer of the epidermis is a single row of cells which continually divides to replace the corneum layer as the same is worn away. The cells gradually die as they move outwardly to corneum, and the corneum itself is essentially dead skin consisting mostly of keratin which is a protein material.

The corneum layer protects the granulosum layer and prevents the granulosum layer from drying out. Under normal skin conditions, the corneum layer contains about 10 to 30% water, which gives the skin elasticity. The lucidum layer, which separates the corneum and granulosum layer, permits the passage of water vapor between the two layers but prevents the outward passage of liquid water and thereby prevents the granulosum layer from losing its water content.

By the procedure of keratinization by which the skin cells are constantly reproduced, a fat-like material is produced which is disposed between the layers of keratin in the corneum and serves as an insulator and a lubricant. This fat material differs from fat produced by the sebaceous glands which are located on the hair roots in the dermis layer of the skin. The sebaceous gland secretes fat into the hair ducts and this fat material passes through the hair openings and lubricates hair on the skin surface.

It had been the theory in the past that the skin becomes dried out due to the loss of the fat materials in the corneum and therefore, many cosmetic and pharmaceutical products have attempted to eliminate dry skin problems by adding fat to the skin. In this regard, materials such as lanolin and other fat base substances have been added to cosmetics in an attempt to introduce fat materials to the corneum layer of the skin.

More recently, however, it has been definitely determined that skin dryness is caused by a lack of water in the corneum layer. Pure keratin material, which is the major constituent of the corneum layer, was originally thought to be hydrophilic and capable of absorbing liquid water. Contrary to this, it has been recently found that pure keratin, while hydroscopic and capable of absorbing water vapor, is hydrophobic and will not absorb liquid water. This fact can be clearly shown in connection with a dry chapped skin which cannot be cured by the application of water. If dried skin is immersed in water, it will remain dry. This is due to the fact that the keratin material is water repellant and is unable to pick up any water in liquid form.

It has also been shown that the sebum will not act to absorb liquid water and cannot change the dryness of the skin. While the sebum or other fat serves to prevent water loss in the normal skin, it is not able to restore lost water to the cells.

After extensive research, a substance was isolated from the water soluble matter in a keratin structure which was shown to make the keratin hydrophilic and enable the cells in the corneum to pick up liquid water. This isolated material, which shall be referred to as a water control material, is capable of not only absorbing water vapor from the atmosphere and water vapor which has passed through the lucidum layer to the corneum, but will also absorb liquid water from body perspiration or from outside sources. By absorbing water, moisture is returned to the corneum cells so that the skin will take on a moist appearance.

This water control material is normally and continually produced by a healthy skin, but if this material is removed by excess washing with soap and detergent or if the skin metabolism is such that not enough of the material is produced, a dry skin will result. However, if the water control material is applied to the dry skin, the liquid water will then be able to wet the skin again and the skin will absorb water and lose its dryness.

It has been found that this water control material can be obtained from keratin structures by a process in which the keratin structure in a finely divided form is refluxed with water or a solution of water and a polar solvent at temperatures below 60° C. The resulting extraction is then subjected to a second extracting process using a non-polar solvent to remove the fat and wax material. The resulting product is an impure form of the water control material and if applied to the skin, will restore the water balance and eliminate dryness.

While this water control material will tend to restore the water balance when applied to dry skin, it has been found that this material has a dark, objectionable color and an offensive odor which, from a practical standpoint, reduces its usefulness in cosmetic and pharmaceutical products.

Attempts have been made to improve the purity of the water control material. In the patent application, Serial No. 691,538, filed October 22, 1957, now Patent No. 3,033,755, a process is disclosed for removing and purifying the water control material from a keratin structure. While the process of this above-named patent application did, to some extent, improve the color, the offensive odor was not completely removed. The present invention is directed to a process of treating the keratin structure to isolate the pure odorless and colorless water control material. The resulting material is produced in an extremely pure form which thereby increases its effectiveness in cosmetic and pharmaceutical products.

The process generally consists of initially refluxing the finely divided keratin structure, such as animal horns, hair, hoofs, etc., with a solution of water and a polar solvent at a temperature below 60° C. for a period of time sufficient to dissolve the water soluble materials from the keratin. After the desired refluxing period, the solution is filtered and the filtrate is passed over an acid ion exchange resin column. The fraction which is adsorbed on the resin is subsequently freed by passing an alkaline material through the resin column. The resulting alkaline solution is then concentrated to at least 50% and subsequently acidified to a gauge of 4 to 6.8 to free the amino acids.

The resulting material constitutes the purified water control material and is substantially colorless and odor free. This material can be incorporated with any of the cosmetic, pharmaceutical and proprietary drug products which are to be applied to the skin. When applied to the skin, the water control material will penetrate into the corneum and thereby enables the corneum layer of the skin to absorb water and contain a moist appearance.

The water control material obtained by the process of the invention is derived from a keratin structure and therefore is compatible with the skin and differs in action entirely from humectants like glycerin and glycol and other so-called moisturizing agents which are foreign to the skin structure. For example, the water control material derived by the process of the invention will provide a balance for the water intake and output for the skin and will not dehydrate the skin as will humectants which, in many cases, not only absorb exterior water but will absorb water from the skin cells.

The water control material has a low surface tension which enables it to penetrate deep into the cornified epithelium and impregnate the cells. Humectants and other so-called moisturizing agents have a high surface tension and remain on the skin surface, being unable to penetrate into the cell layers.

The keratin structure to be employed in the process of the invention is a material, such as animal horns, hair, nails, hoofs or the stratum corneum of the skin. In the case of animal hair, the sebaceous fat is initially removed from the hair by conventional procedures. The keratin material is initially ground to a finely divided condition, preferably having a mesh size in the range of 100 to 200. The finely ground keratin material is then added to a solution of water and a polar solvent, such as ethyl alcohol, methyl alcohol, isopropyl alcohol, acetone, dioxane, or other polar solvents which are miscible with water. Generally, about 5 to 50% by weight of water is employed in the solvent solution.

The amount of the solvent solution mixed with the finely ground keratin material is not critical and is generally in the range of about 7 to 10 parts of the solution to one part by weight of the keratin material.

The mixture is refluxed at a temperature below 60° C. and generally within the range of 45° to 55° C. for a period of time sufficient to remove the water soluble materials from the keratin structure. The refluxing period may generally be in the range of 6 to 12 hours at these temperatures. However, the extraction can also be performed cold. If a temperature below 45° C. is to be employed or if a smaller proportion of the aqueous solution is used, the refluxing period will be correspondingly longer.

After refluxing, the aqueous solution will contain three dissolved fractions which, for clarity of discussion, will be called fractions A, B and C. After completion of the refluxing operation, the aqueous solution is cooled to a temperature in the range of 15 to 25° C. At this temperature range, fraction A will precipitate and the solution is then filtered to remove fraction A. It is important that the material be filtered at a temperature in the range of 15 to 25° C., for above 25° C. fraction A will be soluble and will not be removed by the filtration. If the temperature is below 15° C., materials other than fraction A will be precipitated and removed by the filtration operation.

The filtrate containing fractions B and C has a pH in the range of 3 to 4 and is then passed through a conventional ion exchange resin column. The resin to be employed is a conventional acid ion exchange resin, such as Rohm & Haas Amberlite IR120, which is a sulfonated polystyrene resin. Other ion exchange resins which can be employed are Dow Chemical Company Dowex 50, a styrene-divinyl-benzene copolymer; Permutit Company Permutit Q, a sulfonated polystyrene resin; and the like. The solution is passed over the ion exchange resin at room temperature, or a temperature generally in the range of 15° C to 25° C. and the fraction B in the solution is adsorbed on the surface of the resin, while the fraction C passes through the ion exchange column. The solution is continuously passed over the resin column until the material being discharged from the column has a pH of about 5. An increase in pH to the range of 6 to 7 indicates that the resin is completely saturated with fraction B, and thus to prevent loss of the fraction B, the flow of the solution is stopped when the pH of the discharged solution reaches about 5. The fraction B, which is adsorbed on the resin, is basically the water control material.

After the solution has been passed over the resin exchange column, the resin is washed with a quantity, approximately equal to the volume of the column, of a 70% methanol and 30% water solution. After this washing, a quantity of water equal to approximately 2 volumes of the column is passed over the resin to completely wash all fraction C from the resin.

The fraction B is freed from the resin by slowly passing an ionizable alkaline material over the resin so that the cations will replace the fraction B ions which are adsorbed on the surface of the resin. Any basic material may be employed and it has been found that an ammonia solution is very desirable. For example, 200 cc. of a 2 normal $NH_3$ solution for each 100 cc. of resin is passed over the resin. When the pH of the material being discharged from the ion exchange column reaches approximately 8, the substitution has been completed for excess $NH_4$ ions are then passing through the column.

The alkaline solution of fraction B, which is discharged from the ion exchange column, is approximately a 20% solution and is then concentrated preferably at high vacuum, in the range of 20 to 120 mm. of mercury, to a total solids content of 50% to 100%. The temperature of the concentration must be maintained below 60° C., for if the temperature is above this value, the fraction B will decompose and be destroyed.

In addition, it is desirable to concentrate the alkaline solution to at least a 50% solution. If the material is not concentrated to a 50% solution, the fraction B may tend to decompose and a preservative would have to be added.

The concentrated alkaline solution of the fraction B or water control material is then acidified with an acid to a pH in the range of 4.0 to 6.8. Any acidic material can be employed, such as hydrochloric acid, acetic acid and the like. In this pH range, the amino acids present in the water control material are freed while they are present as salts in the alkaline solution.

The fraction B or water control material has a composition which has not been definitely established, for it is a complex mixture of a multitude of compounds, including polypeptides, glucopeptides, amino acids, urea, lactic acid, citric acid and salts of sodium, potassium, calcium and magnesium.

The resin used in the ion exchange column can be regenerated by washing the column with an acid solution. A two normal solution of hydrochloric acid can be employed with about 200 to 300 cc. of the acid solution being employed with each 100 cc. of the resin in the column. After the acid wash, the column can be rinsed with water. By this procedure, the resin will have unlimited use in the present procedure.

The water control material is substantially odorless and has a very light off-white color. The material can be readily incorporated into all types of cosmetic and pharmaceutical products, such as face creams, lotions, ointments, sprays and the like. When applied to the human skin, the water control material will penetrate into the horny layer of the skin due to its low surface tension. The material will absorb both liquid water and water vapor and thus maintain the proper water balance for the skin. As the water control material is a natural material obtained from keratin structures, it is compatible with the skin and will not cause irritation.

The following examples illustrate the process of obtaining and purifying the water control material from a keratin structure:

*Example No. 1*

500 grams of finely divided horses hoofs having a mesh size of about 150 mesh was placed in a refluxing vessel and 3000 grams of an aqueous methanol solution was added to the keratin material. The methanol solution contained 70% methanol and 30% water.

This mixture was refluxed at a temperature of 50° C. for a period of 12 hours. After the refluxing period, the material was cooled and filtered when the temperature reached 20° C. The precipitate was discarded and the filtrate, at a temperature of 20° C., was passed over an ion exchange column containing 35 grams of Amberlite IR120 as the ion exchange resin. The pH of the material passing through the resin column was about 3.5 and when the pH increased to a value of 5, no further solution was passed over the ion exchange column.

The resin was then washed with 100 cc. of an aqueous solution of methanol containing 70% methanol and 30% by weight of water. After this washing, the resin was rinsed with 200 cc. of water. To free the water control material from the resin, 100 cc. of a 2 normal ammonia solution was passed over the resin. When the pH of the material being discharged from the column reached 8, no further alkaline material was passed through the column.

The resulting alkaline material was then concentrated under a pressure of 50 mm. at a temperature of 25° C. to produce a concentrated solution containing 50% of the water control material.

The concentrated alkaline solution of the water control material was then acidified with hydrochloric acid until the pH of the material was 5. The resulting material was odorless and had a slight off-white color precipitate of amino acids. This material was then incorporated in a cosmetic solution.

*Example No. 2*

250 grams raw wool were placed in a column and were extracted by running 2000 grams of an aqueous methanol solution slowly through the column at room temperature. The methanol solution contained 75% methanol and 25% water.

The extract solution was filtered at 20° C. The precipitate was discarded and the filtrate, at a temperature of 20° C., was passed over an ion exchange column containing 50 grams of Dowex 50 as the ion exchange resin. The pH of the material passing through the resin column was about 2.9 and when the pH increased to a value of 6, no further solution was passed over the ion exchange column.

The resin was then washed with 150 cc. of an aqueous solution of methanol containing 75% methanol and 25% by weight of water. After this washing, the resin was rinsed with 250 cc. of water. To free the water control material from the resin, 115 cc. of a 2 normal ammonia solution was passed over the resin. When the pH of the material being discharged from the column reached 7.8, no further alkaline material was passed through the column. The resulting alkaline material was then concentrated under a pressure of 35 mm. at a temperature of 20° C. to produce a concentrated solution containing 90% of the water control material.

The concentrated alkaline solution of the water control material was then acidified with lactic acid until the pH of the material was 5.5. The resulting material was practically odorless and had a slight yellow color. This material was then incorporated in cosmetic creams.

*Example No. 3*

300 grams of finely divided cow horn having a mesh size of about 180 mesh was placed in a refluxing vessel and 2100 grams of an aqueous methanol solution was added to the keratin material. The methanol solution contained 70% methanol and 30% water. This mixture was refluxed at a temperature of 45° C. for a period of 16 hours. After the refluxing period, the material was cooled and filtered when the temperature reached 20° C. The precipitate was discarded and the filtrate, at a temperature of 20° C., was passed over an ion exchange column containing 45 grams of Permutit Q as the ion exchange resin. The pH of the material passing through the resin column was about 3 and when the pH increased to a value of 6.5, no further solution was passed over the ion exchange column.

The resin was then washed with 125 cc. of an aqueous solution of methanol containing 70% methanol and 30% by weight of water. After this washing, the resin was rinsed with 225 cc. of water. To free the water control material from the resin, 120 cc. of a 2 normal ammonia solution was passed over the resin. When the pH of the material being discharged from the column reached 8, no further alkaline material was passed through the column. The resulting alkaline material was then concentrated under a pressure of 25 mm. at a temperature of 19° C. to produce a concentrated solution containing 75% of the water control material.

The concentrated alkaline solution of the water control material was then acidified with hydrochloric acid until the pH of the material was 6. The resulting material was odorless and had a slightly off-white color. This material was then incorporated in a pharmaceutical ointment.

Various modes of carrying out the invention are contemplated as being within the scope of the following claims particularly pointing out and distinctly claiming the subject matter which is regarded as the invention.

I claim:

1. A process for removing and purifying a topical water control material from a keratin structure, comprising treating a mixture of a finely divided keratin material and an aqueous media at a temperature in the range of 45° to 55° C. for a period of time sufficient to dissolve the water soluble constituents from the keratin, filtering the aqueous media at a temperature in the range of 15° C. to 25° C., passing the filtrate through a cation exchange resin in acid form with a fraction of the filtrate being adsorbed on the surface of the resin, continuing to pass the filtrate through said acid ion exchange resin until the pH of the material being discharged from the resin increases to about 5, passing an aqueous solution of an alkaline material through the resin to free the fraction adsorbed on the resin, said fraction being dissolved in said aqueous solution, continuing to pass said aqueous alkaline solution through said ion exchange resin until the pH of the solution being discharged from the resin increases to a value of about 8, washing the ion exchange resin with an aqueous material to remove any further fraction from the surface of the resin, concentrating the alkaline solution to a value of at least a 50% solution at a temperature below 60° C., and acidifying the solution to lower the pH to a value in the range of 4.0 to 6.8 to thereby free the amino acids present in said fraction, said acidified solution being a purified topical water control material.

2. A process for removing and purifying a water soluble material from a keratin structure, comprising the steps of dissolving the water soluble constituents from the keratin structure in an aqueous media, adjusting the temperature of the aqueous media to a temperature in the range of 15° C. to 25° C. to precipitate a first fraction, separating the first fraction from the aqueous media, removing a second fraction from the aqueous media by adsorbing the second fraction on a cation exchange resin in acid form at a pH up to 7.0, freeing said second fraction from the ion exchange resin at a pH up to 8.0 by passing an ionizable alkaline material over said resin to provide a solution of said second fraction in said alkaline material, concentrating the alkaline solution to at least a 50% solution, and lowering the pH of the alkaline solution into a value in the range of 4.0 to 6.8 to thereby free the amino acids present in said solution, said solution being a purified topical water control material.

3. A process for removing and purifying a topical water control material from a keratin structure, comprising the steps of treating a mixture of finely divided keratin material in an aqueous media at a temperature below 60° F. to dissolve the water soluble constituents from the keratin material, filtering the mixture at a temperature in the range of 15° C. to 25° C., passing the filtrate in contact with a cation exchange resin in acid form at a pH in the range of 3.0 to 5.0 to adsorb a fraction of the filtrate on the surface of the cation exchange resin, eluting the fraction from the cation exchange resin at a pH up to 8.0 by contacting the cation exchange resin with a liquid alkaline solution, concentrating the eluate to at least a 50% solution, and lowering the pH of the eluate to a value in the range of 4.0 to 6.8 to thereby free the amino acids in said eluate, said eluate being a purified topical water control material.

4. A process for removing and purifying a topical water control material from a keratin structure, comprising treating a mixture of finely divided keratin material with an aqueous solution of a polar solvent selected from the group consisting of ethyl alcohol, methyl alcohol, isopropyl alcohol, acetone and dioxane at a temperature in the range of 45° to 55° C. for a period of time sufficient to dissolve the water soluble constituents from the keratin material, filtering the mixture at a temperature in the range of 15° C. to 25° C., passing the filtrate through a bed of a cation exchange resin in acid form at a pH up to 7.0, said filtrate being at a temperature of 15° to 25° C. and a fraction of the filtrate being adsorbed on the surface of the resin, eluting the adsorbed fraction from the resin by passing an alkaline aqueous solution over the resin at a pH to 8.0, concentrating the eluted solution to a total solids content in the range of 50 to 100% at a temperature below 60° C., and acidifying the solution to lower the pH to a value in the range of 4.0 to 6.8 to thereby free the amino acids in said solution and provide a topical water control material.

References Cited by the Examiner

UNITED STATES PATENTS 3,033,755    5/62   Jacobi _____ 167—90

OTHER REFERENCES

Calmon: Ion Exchangers in Organic and Biochemistry, Interscience Pub., New York, 1957 pp. 255–288, 650 (particularly pertinent 259, 260, 650).

JULIAN S. LEVITT, *Primary Examiner.*

M. WOLK, FRANK CACCIAPAGLIA, Jr., L. GOTTS, *Examiners.*